United States Patent [19]

Lundberg et al.

[11] Patent Number: 4,481,318

[45] Date of Patent: Nov. 6, 1984

[54] SULFONATED POLYMER AND COMPOSITIONS THEREOF

[75] Inventors: Robert D. Lundberg, Bridgewater; Warren A. Thaler, Aberdeen, both of N.J.

[73] Assignee: Exxon Research & Engineering Co., Florham Park, N.J.

[21] Appl. No.: 537,056

[22] Filed: Sep. 29, 1983

Related U.S. Application Data

[63] Continuation of Ser. No. 332,850, Dec. 21, 1981, Pat. No. 4,421,898.

[51] Int. Cl.$^3$ .......................... C08K 5/09; C08K 5/17; C08K 5/20; C08K 5/21
[52] U.S. Cl. .................................. 524/211; 524/210; 524/236; 524/300; 524/322; 524/394; 524/398; 524/399; 524/400; 524/409; 524/425; 524/445; 524/451
[58] Field of Search ................ 525/186, 190; 524/113, 524/132, 210, 211, 300, 394, 322, 398, 399, 400

[56] References Cited

U.S. PATENT DOCUMENTS

| | | | |
|---|---|---|---|
| 3,847,854 | 11/1974 | Canter et al. | 524/113 |
| 3,870,841 | 3/1975 | Makowski et al. | 524/132 |
| 3,972,961 | 8/1976 | Hammer et al. | 525/186 |

Primary Examiner—Allan M. Lieberman
Attorney, Agent, or Firm—Richard E. Nanfeldt

[57] ABSTRACT

This invention relates to unique and novel compositions based on chemically combining a sulfonated polymer and a tertiary amine terminated polylactone composition. The resulting amine neutralized sulfonated polymer compositions have a variety of uses including those as diverse as adhesive agents, thermoplastic elastomers, additives uses wherein these materials can be utilized to compatibilize two different polymers which are normally incompatible. These compositions can also be blended with fillers and/or oils when the sulfonated polymer is elastomeric. The materials display thermoplastic character.

5 Claims, No Drawings

SULFONATED POLYMER AND COMPOSITIONS THEREOF

This is a continuation of application Ser. No. 332,850 filed Dec. 21, 1981 and now U.S. Pat. No. 4,421,898.

FIELD OF THE INVENTION

This invention relates to unique and novel compositions based on chemically combining a sulfonated polymer and a tertiary amine terminated polylactone composition. The resulting amine neutralized sulfonated polymer compositions have a variety of uses including those as diverse as adhesive agents, thermoplastic elastomers, additive uses wherein these materials can be utilized to compatibilize two different polymers which are normally incompatible. These compositions can also be blended with fillers and/or oils when the sulfonated polymer is elastomeric. The materials display thermoplastic character.

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically cross-linked elastomer at room temperature. However, these ionically cross-linked elastomers may be processed like a conventional thermoplastic at elevated temperatures under a shear force in the presence of selected preferential plasticizers, which dissipate the ionic associations at the elevated temperatures, thereby creating a reprocessable elastomer.

The basic materials used as neutralizing agents are selected from organic amines or basic materials selected from Groups I, II, III, IV, V VI-B and VIII, and mixtures thereof, of the Periodic Table of Elements.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonated groups at a temperature of forming.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

SUMMARY OF THE INVENTION

Sulfonated polymers have been shown to display many of the characteristics of a covalently cross-linked elastomer or plastic despite the fact that these materials are only physically cross-linked. Such materials would be especially useful to employ in blend compositions, with a variety of other polymers such as polyvinyl chloride, polyurethanes, polystyrene, "Phenoxy A", polyethylene and similar compositions. However, sulfonated polymers are usually incompatible with such compositions except under unusual circumstances.

This invention is concerned with a new class of polymers based on the chemical combination of sulfonated polymers and an amine-terminated polylactone. As such, these polymers can have many of the physical properties of the base sulfonated polymer (such as Sulfo EPDM) but also derive many of the desirable features of the polylactone (such as poly-ε-caprolactone). Generally, the sulfonated polymer and the lactone polymer are not truly molecularly compatible and; therefore, are phase separated. Due to the fact that the sulfonated polymer is chemically combined with a novel class of amine terminated lactones, (as described in U.S. Pat. No. 4,379,914) the resulting grafted polymer system displays some properties of both polymer phases.

Since the polylactones, such as poly-ε-caprolactone, are widely known for their unique compatibility behavior, this invention permits the preparation of polylactone neutralized sulfonated polymers which are useful in a variety of polymer blends. In the case where Sulfo EPDM is the base sulfonated polymer, the combination with amine-terminated poly-ε-caprolactone provides a "graft" system which can behave as a tough and useful thermoplastic elastomer. Such compositions derive their physical properties, in part, from the ionic interactions, but mostly due to the crystalline caprolactone domains which act as physical cross-links. Such systems can also be modified through the addition of oils and fillers, as in the case for other sulfonated elastomers. The resulting materials can, under appropriate conditions, be melt processable.

This invention relates to unique and novel compositions based on chemically combining a sulfonated polymer and a tertiary amine terminated polylactone composition. The resulting amine neutralized sulfonated polymer compositions have a variety of uses including those as diverse as adhesive agents, thermoplastic elastomers, additive uses wherein these materials can be utilized to compatibilize two different polymers which are normally incompatible. These compositions can also be blended with fillers and/or oils when the sulfonated polymer is elastomeric. The materials display thermoplastic character.

The neutralized sulfonated elastomeric polymers of this present invention are derived from elastomeric or thermoplastic polymers wherein the elastomeric polymers are derived from unsaturated polymers which include low unsaturated elastomeric polymers such as Butyl rubbers or EPDM terpolymers.

Alternatively, other unsaturated polymers are selected from the group consisting of partially hydrogenated polyisoprenes, partially hydrogenated, polyisoprenes, partially hydrogenated polybutadienes, Neoprene, styrene-butadiene copolymers or isoprene-styrene random copolymers.

The expression "Butyl rubber" as employed in the specification and claims, is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight as measured by GPC of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably, about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1+3, 212° F.) of about 40-50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt. % ethylene and about 1 to about 10 wt. % of a diene monomer, the balance of the polymer being propylene. Preferably, the polymer contains about 45 to about 70 wt. % ethylene, e.g. 50 wt. % and about 2.6 to about 8.0 wt. % diene monomer, e.g. 5.0 wt. %. The diene monomer is preferably a nonconjugated diene.

Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}n$ as measured by GPC of Vistalon 2504 is about 47,000, the $\overline{M}v$ as measured by GPC is about 145,000 and the $\overline{M}w$ as measured by GPC is about 174.000.

Another EPDM terpolymer Vistalon 2504-20 is derived from Vistalon 2504 (Exxon Chemical Co.) by a controlled extrusion process, wherein the resultant Mooney viscosity at 212° F. is about 20. The $\overline{M}n$ as meaured by GPC of Vistalon 2504-20 is about 26,000, the $\overline{M}v$ as measured by GPC is about 90,000 and the $\overline{M}w$ as measured by GPC is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}v$ as measured by GPC of the EPDM terpolymer is preferably below about 350,000 and more preferably below about 300,000. The $\overline{M}w$ as measured by GPC of the EPDM terpolymer is preferably below about 500,000 and more preferably below about 350,000.

The neutralized sulfonated thermoplastic polymers of the instant invention are derived from polystyrene type thermoplastics polymers which are selected from the group consisting of polystyrene, poly-t-butyl-styrene, polychlorostyrene, polyalpha methyl styrene and co- or terpolymers of the aforementioned with acrylonitrile or vinyl toluene.

The polystyrene thermoplastics suitable for use in the practice of the invention have a glass transition temperature from about 90° C. to about 150° C., more preferably about 90° C. to about 140° C. and most preferably about 90° C. to about 120° C. These polystyrene resins have a weight average molecular weight as measured by GPC of about 5,000 to about 500,000 more preferably about 20,000 to about 350,000 and most preferably about 90,000 to about 300,000. These base polystyrene thermoplastic resins can be prepared directly by any of the known polymerization processes. The term "thermoplastic" is used in its conventional sense to mean a substantially rigid (flexus modulus 10,000 psi) material capable of retaining the ability to flow at elevated temperatures for relatively long times.

The preferred polystyrene thermoplastic resin is a homopolymer of styrene having a number average molecular weight of about 180,000, and an intrinsic viscosity in toluene of about 0.8. These polymers are widely available commercially in large volume. A suitable material is Styron 666 which affords a number molecular weight of about 105,000.

In carrying out the invention, the polymer is dissolved in a nonreactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and nonreactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated elastomeric polymer has about 10 to about 200 meq unneutralized sulfonate groups per 100 grams of sulfonated polymer, more preferably about 15 to about 100; and most preferably about 20 to about 80. The meq. of unneutralized sulfonate groups per 100 grams of polymer is determined by both titration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The unneutralized form is titrated with ethanolic sodium hydroxide to an Alizarin-Thymolphthalein endpoint.

The unneutralized sulfonated polymer is gel free and hydrolytically stable. Gel is measured by stirring a given weight of polymer in a solvent comprised of 95 toluene-5-methanol at a concentration of 5 wt. %, for 24 hours, allowing the mixture to settle, withdrawing a weighed sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the unneutralized sulfonated polymer is done by the addition of a solution of a polycaprolactone polymer to the unneutralized sulfonated elastomeric polymer typically dissolved in the mixture of the aliphatic alcohol and nonreactive solvent. The polycaprolactone polymer is dissolved in a solvent system consisting of toluene, optionally containing an aliphatic alcohol. These polycaprolactone polymers are formed by the reaction of $\epsilon$-caprolactone with an organic diamine in the presence of a catalyst as described in a copending application. The anhydrous $\epsilon$-caprolactone and the organic diamine in the presence of the catalyst are reacted together in a reaction vessel in the absence of a solvent at a temperature of about 50° to about 200° C., more preferably about 75° to about 180° and most preferably about 90° to about 100° C. for a sufficient period of time to effect polymerization.

The reaction of the $\epsilon$-caprolactone with the diamine can be generally depicted by the equation

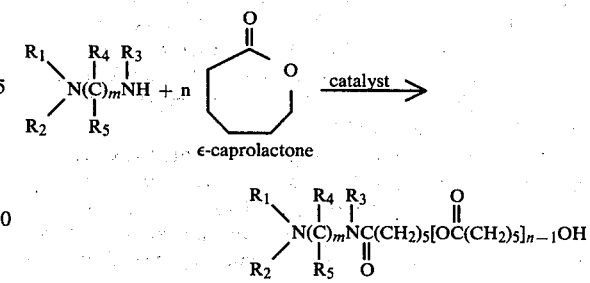

wherein $n = 1$ to 500, $m = 1$ to 20, $R_1$ or $R_2$ are selected from the group consisting of alkyl and cycloalkyl groups having about 1 to about 20 carbon atoms, more preferably about 1 to about 12 carbon atoms, and aryl groups, and $R_3$ is selected from the group consisting of hydrogen, alkyl and cycloalkyl groups having about 1 to about 20 carbon atoms, more preferably about 1 to about 12, and aryl groups and $R_4$ and $R_5$ are hydrogen, alkyl, cycloalkyl or aryl groups. Typical, but nonlimiting, examples of useful diamines are:

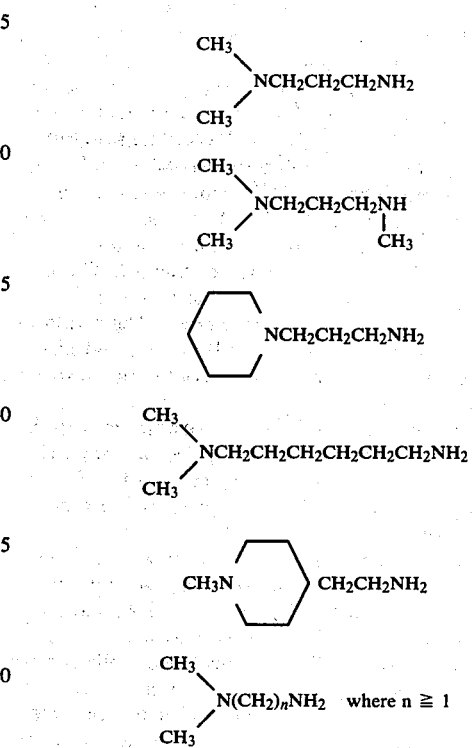

Catalysts useful in the promotion of the above-identified reaction are selected from the group consisting of stannous octanoate stannous hexanoate, stannous oxalate, tetrabutyl titanate, a variety of metal organic based catalysts, acid catalysts and amine catalysts, as described on page 266, and forwarded in a book chapter authored by R. D. Lundberg and E. F. Cox, entitled *Kinetics and Mechanisms of Polymerization: Ring Opening Polymerization;* edited by Frisch and Rugen, published by Marcell Dekker in 1969, wherein stannous octanoate is an especially preferred catalyst. The catalyst is added to the reaction mixture at a concentration level of about 100 to about 10,000 parts of catalyst per 1 million parts of $\epsilon$-caprolactone.

The resultant polycaprolactone polymer has an $\overline{M}n$ as measured by GPC of about 200 to about 50,000 more preferably about 500 to about 40,000, and most preferably from 700 to about 30,000 and a melting point from below room temperature to about 55° C., more preferably about 20° C. to about 52° C., and most preferably about 20° C. to about 50° C.

The metal sulfonate-containing polymers at the higher sulfonate levels possess extremely high melt viscosities and are thereby difficult to process. The addition of ionic group plasticizers markedly reduces melt viscosity and frequently enhances physical properties.

To the neutralized sulfonated polymer is added, in either solution or to the crumb of the unneutralized form of the sulfonated polymer, a preferential plasticizer selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, antimony, iron, lead or Groups I-A, II-A, I-B and II-B of the Periodic Table of Elements, and mixtures thereof. The carboxylic acids are selected from the group consisting of lauric, myristic, palmitic or stearic acids and mixtures thereof; e.g. zinc stearate, magnesium stearate, or zinc laurate.

The preferential plasticizer is incorporated into the neutralized sulfonated polymer at least about 3 to less than about 60 parts by weight per 100 parts of the sulfonated polymer more preferably at about 5 to about 40, and most preferably at about 7 to about 25. Alternatively, other preferential plasticizers are selected from ureas, thioureas, amines, amides, ammonium and amine salts of carboxylic acids and mixtures thereof. The preferred plasticizers are selected from fatty acid or metallic salts of fatty acid and mixtures thereof. The resultant neutralized sulfonated polymer with preferential plasticizer is isolated from the solution by conventional steam stripping and filtration.

Various other additives can be incorporated into the blend compositions to improve the physical properties, the appearance, the chemical properties of the formed elastomeric article or to modify the processability of the blend compositions.

Fillers can be incorporated into the blend compositions at about 50 to about 300 parts by weight of the sulfonated polymer, wherein the filler is selected from the groups consisting of clay, talcs and calcium carbonate, and mixtures thereof. Nonpolar process oils can be incorporated into the blend composition at about 25 to about 150 parts by weight of the sulfonated polymer, wherein the nonpolar process oil is selected from the group consisting of paraffinic oils, naphthenic oils and aromatic oils and mixtures thereof.

A crystalline polyolefinic thermoplastic can be incorporated into the blend composition in minor proportions as a means for modification of the rheological properties of the blend compositions as well as the stiffness of the elastomeric article. Typically, the crystalline polyolefinic thermoplastic is added to the blend composition at a concentration level of less than about 100 parts by weight per 100 parts of sulfonated polymer, more preferably at about 0 to about 75; and most preferably at about 0 to about 50.

The crystalline polyolefin is characterized as a polymer of an alphaolefin having a molecular weight of at least 2,000 preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alphaolefins. Most preferably the polyolefins are selected from the group consisting of polyethylene, polybutene, polypropylene, and ethylene-propylene copolymers. It is critical that the crystalline polyolefin have a high degree of crystallinity of at least 25% and most preferably at least 40%.

Both high and low density polyethylene are within the scope of the instant invention. For example, polyethylenes having a density from 0.90 to 0.97 gms/cc. are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment as well as a means for improving the ionic bonding force between the sulfonate groups in the sulfonated elastomeric polymer. The zinc oxide is incorporated into the blend composition at a concentration level of less than about 0 to about 25 parts by weight per 100 parts of sulfonated polymer, more preferably about 5 to about 15. Alternatively, a Rutile or Anatese titanium dioxide can be employed as a whitening pigment.

A lubricant can be employed in the blend composition at a concentration level of less than about 20 parts by weight per 100 parts of the neutralized sulfonated polymers, and more preferably about 1 to about 15. The lubricants of the present instant invention are nonpolar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

The ingredients incorporated into the blend compositions of the present invention, in conjunction with the type of elastomeric polymer, the degree of sulfonation, and the metal counterion of the neutralized sulfonated polymer and the plasticizer give materials processable by extrusion or injection molding processes into elastomeric articles having the desirable physical and rheological properties. These combined physical properties and rheological processability characteristics were not previously obtainable in the aforementioned U.S. patents and applications previously incorporated herein by reference.

The polymer compositions prepared according to this invention cover a variety of new systems and applications. For example, Sulfo EPDM neutralized with tertiary amine terminated poly-ε-caprolactone can possess a variety of properties depending on sulfonic acid content and poly-ε-caprolactone (or PCL) molecular weight. Thus, a high molecular weight PCL (for example, a number average molecular weight of 10,000) coupled with Sulfo EPDM of 30 milliequivalents per 100 grams sulfonic acid content would require about 300 grams of PCL per 100 grams of Sulfo EPDM to effect neutralization. Such a composition, therefore, would be about 75 percent PCL. On the otherhand, the use of a PCL polymer of 1,000 molecular weight would result in a neutralized graft ionomer of about 23 percent PCL. The physical properties of these two compositions will obviously vary substantially, depending on the compositions.

Similarly, sulfonated polystyrene (S-PS) can be neutralized with PCL. In this case, polystyrene can be sulfonated over a range of sulfonic acid contents from as little as 1 mole percent up to about 100 mole percent. In the former case, only 1 of every 100 repeat units contains sulfonic acid groups, while in the latter case, every aromatic group is sulfonated. Obviously, the range of compositions available, depending on the PCL molecular weight of the sulfonic acid content, is extremely large. The variation in physical properties available, similarly, is large.

The application to which these novel polymers can be put to use is varied. The PCL/Sulfo EPDM grafts are useful as thermoplastic elastomers and potential adhesives.

Other types of polymer sulfonic acids suitable in this invention include sulfonated polybutadiene, sulfonated polyisoprene, sulfonated Butyl, sulfonated SBR, sulfonated polypentenomer, etc. Of special interest are polymers with terminal unsaturation such as polyisobutylene. Typically, this polymer is terminated with an olefin group which can be sulfonated to provide a long chain polyisobutylene of from 500 to 25,000 in molecular weight. Sulfonation of this functionality provides a polymer with a sulfonic acid group at just one end, and which can then be neutralized to provide a polyisobutylene/PCL block copolymer composed of just two blocks.

The sulfonated aromatic polymers can be of special use as potential compatibilizers or adhesives between polymers which do not normally adhere or blend to form compatible blends. Examples of such polymers are Butyl rubber and polyvinyl chloride or polyisobutylene and polyester-based polyurethanes.

The potential list of polymers which can be adhered or blended together by the use of these concepts is extensive and will be summarized only briefly in this application. Obviously, the list of polymers suitable for such uses will depend on the particular PCL/Sulfonated polymer considered. The following list is intended to represent combined systems for several types of such grafts, as indicated.

TABLE I
COMPATIBILITY TABLE FOR SULFO POLYSTYRENE/ PCL GRAFTS

| Column A<br>Polymer phase Compatible<br>with Polystyrene | Column B<br>Polymer Phase Compatible<br>with PCL |
|---|---|
| Polystyrene | Polyvinyl chloride |
| Rubber toughened polystyrene (impact modified) | Nitrocellulose |
| Acrylonitrile/butadiene/styrene Terpolymer (ABS resin) | Low density polyethylene<br>Phenoxy A<br>Polyvinyl butyral |
| Styrene/acrylonitrile copolymers | Polyester based polyurethanes |
| Styrene/methylmethacrylate copolymers | Vinyl chloride/vinylidene chloride copolymers |

While this is only a partial list of systems, it is intended to show the versatility of the polymer grafts described in this invention.

Unless otherwise specified, all measurements are in parts by weight per 100 parts of sulfonated polymer.

EXAMPLE 1

3.5 g (1 meq.) of a sulfonated EPDM (based on EPDM of 50 percent ethylene, 45 percent propylene and 5 percent ENB, sulfonated with acetyl sulfate in situ, as described in U.S. Pat. No. 4,221,712 and related cases, isolated in methanol as the acid form, and dried in a vacuum oven at ~35° C.) containing 29.0 meq. of sulfur per 100 g of polymer, as determined by elemental analysis, was dissolved in 66.5 g toluene overnight to give a 5.0 weight percent solution.

2.1 g (1 meq.) of an N,N-dimethyl-1,3-propane diamine terminated polycaprolactone MW 2,100 %N=1.314±0.005 percent prepared as described in U.S. Pat. No. 4,379,914, was dissolved in 18.9 g of toluene to give a 10.0 weight percent solution. This solution was then added to the highly viscous EPDM polymer sulfonic acid solution prepared above.

Films were cast from the solution of neutralized polymer acid onto Teflon coated aluminum foil. The solvent was removed by evaporation at ambient conditions. The resultant films were a slightly hazy yellow and showed no visible signs of phase separation. The resulting films appeared to be tough and flexible with no evidence of incompatibility.

Thermal mechanical analysis conducted on the polymer sample revealed a major transition at about $-65°$ C. (EPDM Tg) and a second transition at about 38° C., identified as the crystalline melting point for the polycaprolactone phase.

EXAMPLE 2

3.5 g (1 meq.) of a sulfonated EPDM (similar to that of Example 1) sulfonated with acetyl sulfate in situ, isolated in methanol, as the acid form, and dried in a vacuum oven at ~35° C.) containing 29.0 meq. of Sulfur per 100 g of polymer, as determined by elemental microanalysis, was dissolved in 66.5 g toluene overnight to give a 5.0 weight percent solution.

3.98 g (1 meq.) of an N,N-dimethyl-1,3-propane diamine terminated polycaprolactone MW 3,980 %N=0.682±0.003 was dissolved in 35.8 g toluene to give a 10.0 weight percent solution. This solution was then added to the highly viscous EPDM polymer sulfonic acid solution prepared above.

Films were cast from the final solution of the neutralized polymer acid using Teflon coated aluminum foil pans as the substrate. The solvent was removed by evaporation at ambient. These films did not phase separate, but were hazier and stiffer than those prepared under Example 1.

EXAMPLE 3

3.5 g (1 meq.) of the sulfonated EPDM, described in Example 1, was dissolved in 31.5 g of toluene+0.5 g of methanol to give a 9.86 weight percent solution.

3.98 g (1 meq.) of the amine terminated polycaprolactone amine, described in Example 2, was dissolved in 35.8 g of toluene to give a 10.0 weight percent solution. This solution was then added to the highly viscous EPDM polymer sulfonic acid solution prepared above.

Films were cast onto Teflon coated aluminum foil from the neutralized polymer acid solution. The solvent was allowed to evaporate at ambient conditions. These films were identical in appearance to those prepared in Example 2 without the presence of any methanol.

EXAMPLE 4

A solution of the sulfonated EPDM, described in Example 1, was prepared as in Example 1 in toluene to give a 5.0 weight percent solution.

3.98 g of the amine terminated polycaprolactone described in Example 2 were dissolved in 6.02 g of toluene to give a 39.8 weight percent solution. This solution was added to the polymer sulfonic acid solution prepared above. Four to six grams of toluene were used as a rinse to insure the complete transfer of the polymeric amine into the polymeric acid solution.

EXAMPLE 5

7.48 g of dihexylphthalate were added to a neutralized polymer acid solution prepared as described in Example 4. Films were cast onto Teflon coated aluminum foil pans, and the solvent was allowed to evaporate at ambient conditions. These films, with 50 weight percent dihexylphthalate, were fragile and crystalline, and left a residual layer on the casting substrate.

EXAMPLE 6

7.48 g of solvent 100N were added to a neutralized polymeric acid solution prepared as described in Example 4. Films were cast onto Teflon coated aluminum foil pans and the solvent was allowed to evaporate at ambient conditions. These films, containing 50 weight percent solvent 100N, were soft, sticky, clear and exuded oil.

EXAMPLE 7

3.74 g of dihexylphthalate and 3.74 g of solvent 100N were added to a neutralized polymer acid solution prepared as described in Example 4. Films were cast onto Teflon coated aluminum foil pans, and the solvent was allowed to evaporate at ambient. These films were tougher than those of Example 6, and contained regions which appeared to be crystalline.

Since many modifications and variations of this invention may be made without departing from the spirit or scope of the invention thereof, it is not intended to limit the spirit or scope thereof to the specific examples thereof.

What is claimed is:
1. A polymeric composition which comprises:
   (a) a sulfonated polymer with about 10 to about 200 meq. of sulfonate groups per 100 grams of said sulfonated polymer, said sulfonate groups being neutralized with a polycaprolactone polymer having the formula:

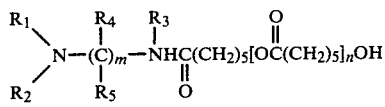

wherein $n = 1$ to 500, $m = 1$ to 20, $R_1$ or $R_2$ is selected from the group consisting of alkyl and cycloalkyl groups having about 1 to about 20 carbon atoms, $R_1$ is selected from the group consisting of hydrogen, alkyl and cycloalkyl groups having about 1 to about 20 carbon atoms and aryl groups, and $R_4$ and $R_5$ are selected from the group consisting of hydrogen, alkyl, cycloalkyl and aryl groups, wherein said sulfonated polymer is formed from an elastomeric polymer selected from the group consisting of Butyl rubber and an EPDM terpolymer or from a polymer selected from the group consisting of polystyrene, poly-t-butylstyrene, polychlorostyrene and poly-2-methylstyrene, said polycaprolactone polymer having an $\overline{M}_n$ as measured by GPC of about 200 to about 50,000 and a melting point from below room temperature to about 55° C.;
   (b) about 25 to about 150 parts by weight of a nonpolar process oil per 100 parts by weight of the sulfonated polymer;
   (c) about 50 to about 300 parts by weight of a filler per 100 parts by weight of the sulfonated polymer; and
   (d) at least about 3 parts by weight of a preferential plasticizer per 100 parts by weight of the sulfonated polymer.

2. A composition according to claim 1, wherein said preferential plasticizer has a melting point of at least 25° C. and is selected from the group consisting of carboxylic acids having at least 8 carbon atoms, metallic salts of said carboxylic acids, ureas, thioureas, amides, ammonium and amine salts of said carboxylic acids and amines and mixtures thereof.

3. A composition according to claim 1, wherein said preferential plasticizer is a combination of a carboxylic acid and a metallic salt of said carboxylic acid, a metal ion of said metallic salt being selected from the group consisting of aluminum, antimony, iron, lead and Groups I-A, II-A, I-B and II-B of the Periodic Table of Elements and mixtures thereof.

4. A composition according to claim 1 wherein said filler is selected from the group consisting of clay, talc and calcium carbonate, and mixtures thereof.

5. A composition according to claim 1, wherein said nonpolar process oil is selected from the group consisting of paraffinic oil, naphthenic oil and aromatic oil and mixtures thereof.

* * * * *